(12) United States Patent
Kaya et al.

(10) Patent No.: US 11,042,191 B2
(45) Date of Patent: Jun. 22, 2021

(54) INFORMATION HANDLING SYSTEM WITH MULTIPLE DETACHABLE DISPLAYS

(71) Applicant: Dell Products L.P., Round Rock, TX (US)

(72) Inventors: Hasan Giray Kaya, Cedar Park, TX (US); Bo Hom, Round Rock, TX (US)

(73) Assignee: Dell Products L.P.

( * ) Notice: Subject to any disclaimer, the term of this patent is extended or adjusted under 35 U.S.C. 154(b) by 26 days.

(21) Appl. No.: 15/640,425

(22) Filed: Jun. 30, 2017

(65) Prior Publication Data
US 2019/0004568 A1 Jan. 3, 2019

(51) Int. Cl.
*G06F 1/16* (2006.01)
*G06F 3/14* (2006.01)

(52) U.S. Cl.
CPC .......... *G06F 1/1647* (2013.01); *G06F 1/1616* (2013.01); *G06F 1/1654* (2013.01); *G06F 1/1681* (2013.01); *G06F 3/1431* (2013.01); *G06F 3/1446* (2013.01)

(58) Field of Classification Search
CPC .... G06F 1/1647; G06F 3/1431; G06F 3/1446; G06F 1/1654; G06F 1/1616; G06F 1/1681
See application file for complete search history.

(56) References Cited

U.S. PATENT DOCUMENTS

| | | | | |
|---|---|---|---|---|
| 5,949,643 A * | 9/1999 | Batio | ................... | G06F 1/1616 345/168 |
| 7,864,514 B2 * | 1/2011 | Lee | ........................ | F16M 11/10 361/679.21 |
| 9,167,711 B2 * | 10/2015 | Lee | ........................ | G06F 1/1654 |
| 9,910,464 B2 * | 3/2018 | Lyles | ..................... | G06F 1/1669 |
| 9,983,637 B1 * | 5/2018 | Morrison | ............... | G06F 1/1681 |
| 2008/0062625 A1 * | 3/2008 | Batio | .................... | G06F 1/1615 361/679.29 |
| 2010/0238620 A1 * | 9/2010 | Fish | ....................... | G06F 1/1616 361/679.09 |
| 2013/0009987 A1 * | 1/2013 | Takishita | ............... | G06F 1/1616 345/619 |
| 2013/0012273 A1 * | 1/2013 | Sato | ....................... | G06F 1/1624 455/566 |
| 2014/0313665 A1 * | 10/2014 | Delpier | ................. | G06F 1/1616 361/679.55 |
| 2015/0378399 A1 * | 12/2015 | Grinstead | ............. | G06F 1/1681 361/679.09 |
| 2016/0091924 A1 * | 3/2016 | Aoki | ...................... | G06F 1/1698 361/679.09 |

* cited by examiner

*Primary Examiner* — David D Davis
(74) *Attorney, Agent, or Firm* — Norton Rose Fulbright US LLP

(57) ABSTRACT

A portable information handling system may attach to and support multiple detachable displays in a variety of configurations. A base of a portable information handling system may include a means for attaching to and supporting multiple displays, such as a channel for magnetically attaching to one or more bars of one or more displays. A user may operate the information handling system in a presentation configuration with one display facing towards the user and another display facing towards an audience. If the both displays are facing toward a user, the system can provide a user with an extended display area with more space to view and manipulate information. The second display may be detached from a top side and attached to a bottom side of a laptop for storage during transport.

18 Claims, 9 Drawing Sheets

INFORMATION HANDLING SYSTEM WITH MULTIPLE DETACHABLE DISPLAYS

FIELD OF THE DISCLOSURE

The instant disclosure relates to information handling systems. More specifically, portions of this disclosure relate multi-display portable information handling systems.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Desktop computers and other stationary information handling systems can connect to multiple displays to enhance the ability of users to view and manipulate information. The use of multiple displays can also allow users to display content, such as application windows, to an audience more easily than if the audience was viewing a single display. Multiple display configurations can also allow a user to display more content at the same time, reducing the need to search through lists of open windows to find desired content. Some information handling systems are designed with portability in mind, such as laptop and notebook computers. Given their portable nature, such information handling systems may have limited display size and may be limited to a single display, thus limiting the amount of information that can be displayed and manipulated. The limited size of portable information handling system displays may also limit the ability of users to display content to an audience. Portable information handling systems, such as laptops, may be configured to connect to multiple external displays through display ports, such as in conventional stationary information handling systems. However, by its nature, a portable information handling system is not likely to be near multiple displays, which are cumbersome to transport.

Shortcomings mentioned here are only representative and are included simply to highlight that a need exists for improved information handling systems, particularly for multi-display portable information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system with multiple attachable, storable displays can provide many of the advantages of desktop computing with multiple displays while retaining the advantages of portability. Multiple configurable displays may provide users with flexibility in display options. For example, a user may operate the information handling system in a presentation configuration with one display facing towards the user and another display facing towards an audience. If the both displays are facing toward a user, the system can provide a user with an extended display area with more space to view and manipulate information. A user can also detach some displays and operate, for example, only a single display to conserve power and minimize the space taken up by the portable information handling system.

A portable information handling system may include a first display, a second display, and a base with an integrated keyboard. The base may also include an integrated component or components for attaching to and supporting the first and second displays. Attachment may be facilitated by, for example, a channel on the base configured to magnetically attach to and support the displays. The channel may include a metal such as steel. The displays may include bars at edges of the displays for attaching the displays to the base. For example, each display may have a bar attached to its bottom edge. The bars may be magnetic and may be cylindrical. The channel may be configured to magnetically attach to the bars and to support the displays. A cylindrical channel may encompass greater than 180 degrees of the circumference of the bars. This may further secure the displays by requiring the bars of the displays to be slid into and out of the channel via a first or second end of the channel instead of allowing insertion and removal of the bars via a top of the channel. The channel may be an upward-facing channel to allow the bar of the first display and the bar of the second display to rest in the channel when the first and second displays are attached to and supported by the channel. The base may also include an integrated downward-facing channel for attaching to one of the first and second displays. Among other uses, the downward-facing channel may be used to store the display beneath the base when the information handling system is not in use or is being used in a single-display configuration.

The base may include first and second interfaces for connecting to the first and second displays. Data and power may be transmitted between the base and the displays via the first and second interfaces. The displays may, likewise, each have first and second interfaces, respectively, for connecting to the first and second interfaces of the base. The first and second interfaces of the base and the first and second interfaces of the displays may be wireless interfaces or may connect through physical contact between display interfaces and base interfaces. The first and second interfaces of the base may each be capable of transmitting power and display data to support a single display. The first and second interfaces of the first and second displays may be identical, and the first and second interfaces of the base may be identical. Thus, an interface of the first display may be connected to the first interface of the base while an interface of the second display may be connected to the second interface of the base, allowing for multi-display functionality. The first and second interfaces of the base may have symmetrical power and communication pin layouts. A symmetrical pin layout may allow a display to operate in different orientations. As a result, the first and second displays may connect and attach to the base with both displays facing toward the front of the base, with both displays facing out from the back of the base, or with one display facing toward the front of the base and one display facing out from the back of the base.

The base may attach to the first and second displays in a variety of configurations to enhance functionality. For example, the base may attach to and support the first display alone in a single-display configuration. The base may store the second display beneath the base in such a configuration. The base may also attach to and support both the first display and the second display simultaneously in a dual-display configuration. For example, the first and second displays may be attached to and supported by the base while facing in the same direction. Such a configuration may provide a user with extended display area. Alternatively, the first and second displays may be attached to and supported by the base while facing in opposite directions. Such a configuration may allow a user to present information to viewers without requiring the viewers to stand behind and view the same display as the user. The base may store both the first display and the second display in a closed configuration.

The portable information handling system may include a controller. The controller may detect a configuration of the multiple displays attached to and supported by the base and may adjust a display output to the plurality of displays based on the detected configuration. For example, the controller may detect two attached and supported displays facing in the same direction and may adjust the display output to display different content on each of the two attached and supported displays. The controller may detect two attached and supported displays facing in opposite directions and may adjust the display output to display the same content on each of the two attached and supported displays.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1A:
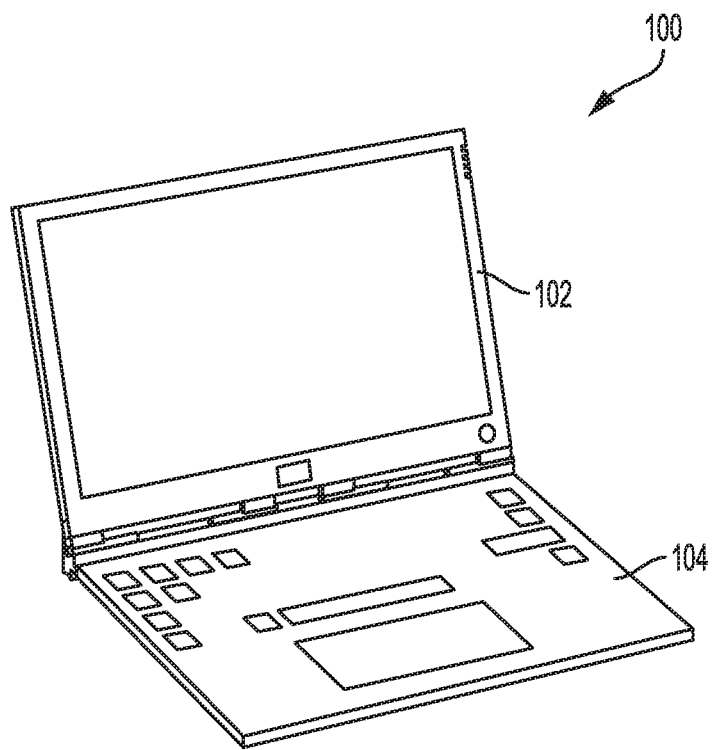
FIG. 1A is an illustration of a portable information handling system with a detachable display according to some embodiments of the disclosure.

A multi-display portable information handling system, such as a laptop or notebook computer, may include a base and multiple detachable displays. FIG. 1A is an illustration of a portable information handling system 100 configured to support multiple detachable displays including a base 104 and a detachable display 102. The base 104 may attach to and physically support multiple detached displays similar or identical to detachable display 102 simultaneously. The display 102 may be attached to and supported by the base 104 to keep the display in an upright position for use by a user in a single-display configuration, as illustrated in FIG. 1A. Alternatively, the display 102 could be reversed to face away from the base 104, to operate the information handling system 100 in a viewing configuration. The display 102 may include a capacitive or resistive touch screen. The information handling system 100 may, alternatively, operate in a single-display tablet configuration where the display 102 is reversed and closed face-up over a keyboard of the base 104.

Figure 1B:
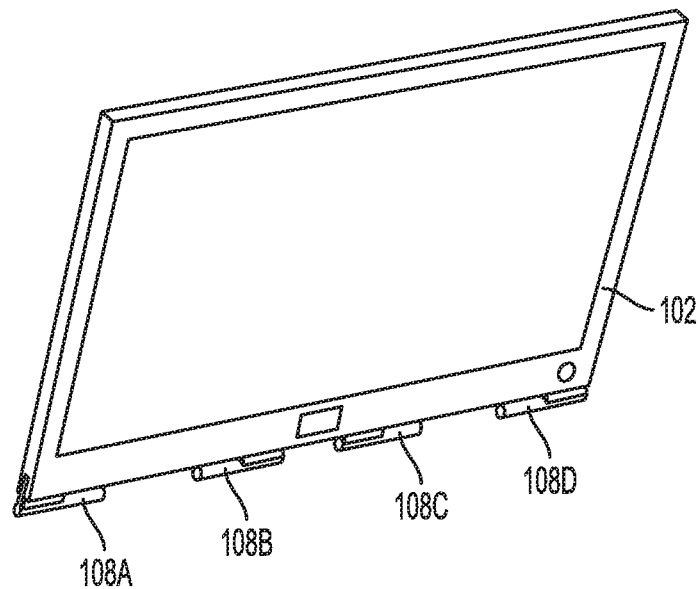
FIG. 1B is an illustration of a detachable display of a portable information handling system according to some embodiments of the disclosure.

When a user adjusts the operating configuration of the portable information handling system 100, one or more displays may be detached from the base 104 and reattached in a desired configuration. FIG. 1B is an illustration of an example detached display 102. The display 102 may be a 15-inch display, a 14-inch display, an 11-inch display, an 8.5-inch display, or other display size. Multiple displays of different sizes may attach to and be supported by a base simultaneously. The display 102 may contain information handling system components such as memory, a hard drive, a battery, a graphics card, a processor, an external media reader, a USB port, a display port, an HDMI port, a charging interface for one or more batteries of the portable information handling system, a cooling fan, a speaker, or other information handling system components. The display 102 may function separately from a base as a tablet device. Information handling system components, such as memory, hard drives, batteries, and the like, may be housed entirely in a base, or divided between a display and a base. The display 102 may also include one or more physical and/or wireless interfaces for connecting the display 102 to a base.

The display 102 may include one or more components for attaching the display 102 to a base. For example, the detachable display 102 may include several bars 108A-D for attaching to a base. Interfaces, such as contact pads or pins, for connecting with one or more interfaces of the base may be located between the bars, such as between bars 108A and 108B and/or between bars 108C and 108D. Such interfaces may be identical to each other to facilitate interchangeable connection to various base interfaces. Alternatively, the display 102 may have a single bar along the length of the display 102 for attaching to a base. The single bar may be integrated into the display 102, to form a rounded bottom edge of the display 102 to fit in a channel of the base. Contact pads, or other interfaces, may be integrated into the bar for connecting the display 102 to a base. The bars 108A-D may include metal, to facilitate attachment to a magnetic element of the base, or the bars 108A-D may include a magnetic element, to facilitate attachment to a metallic element of a base. The bars 108A-D may include a non-ferrous material surrounding one or more magnetic elements. Other components for attaching the display 102 to a base may be alternatively or additionally attached to the display such as a metallic or magnetic channel to facilitate attachment to one or more metallic or magnetic bars of a base, a plate of a hinge, a clip, a slot to accept and/or magnetically attach to a plate of a hinge, a screw, a hole for a screw, a latch, a lever, a return spring, a cam, or other means for attaching the display 102 to the base. A kickstand may also be included in the display 102 to provide additional support.

Figure 1C:
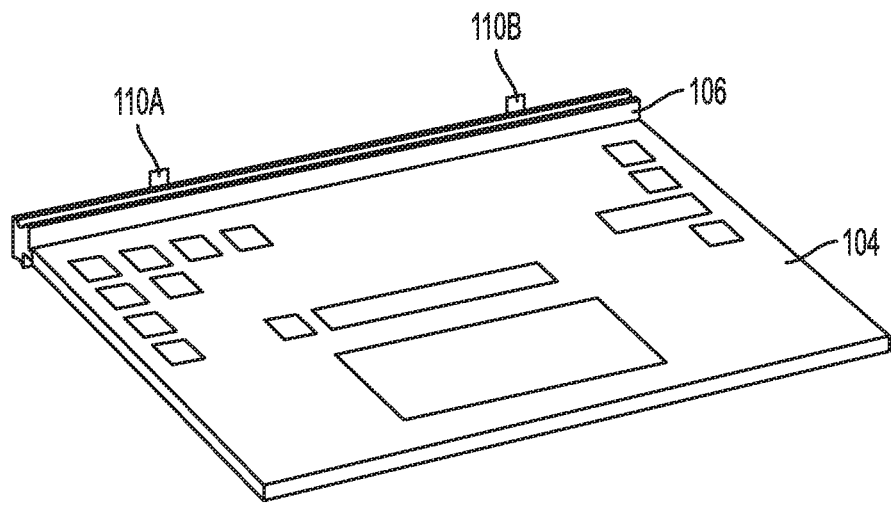
FIG. 1C is an illustration of a base of a portable information handling system according to some embodiments of the disclosure.

A base, such as base 104 illustrated in FIG. 1C may attach to and physically support multiple displays. The base 104 may contain information handling system components such as memory, a hard drive, a battery, a graphics card, a processor, an external media reader, a USB port, a display port, an HDMI port, a charging interface for one or more batteries of the portable information handling system, a cooling fan, speakers, or other information handling system components. The base 104 may include one or more components for attaching to and supporting multiple displays such as channel 106. The channel 106 may span a length of the base 104, or a plurality of separate channels may be aligned along the length of the base. The channel 106 may be composed of or include a metal, such as steel, or may include magnetic elements. The channel 106 may face upwards, perpendicular to the base 104, or may face out from a back of the base 104, or be positioned at other angles in between. The channel 106 may be sized to encompass at least part of the circumference of one or more cylindrical bars of one or more detachable displays. For example, the channel 106 may be sized to encompass greater than 180 degrees of a circumference of one or more cylindrical bars of one or more displays. A channel 106 encompassing greater than 180 degrees of the circumference could further secure displays when they are attached to and supported by the base 104 by preventing the cylindrical bars of the displays from being removed from or inserted into the channel 106 except through removal or insertion at one or more ends of the channel 106. The channel 106 and bars may be configured to lock at multiple degrees of rotation of the bars, so as to support multiple stable display angles. Alternatively or additionally, the channel 106 may be tightened around one or more bars of one or more displays attached to and supported by the base 104, to secure the displays, and loosened to facilitate easier removal. Other components for attaching the base 104 to one or more displays may be included in the base 104, in place of or in addition to channel 106, such as one or more metallic or magnetic bars to facilitate attachment to a magnetic or metallic channel of one or more displays, a plate of a hinge, a clip, a slot to accept and/or magnetically attach to a plate of a hinge, a screw, a hole for a screw, a latch, a cam, or other means for attaching the base 104 to one or more displays.

The base 104 may contain interfaces 110A and 110B for connecting to multiple displays attached to and supported by the base 104. The interfaces 110A-B may be physical or wireless interfaces for transmitting display data and other information handling system data and power between the base 104 and one or more displays attached to and supported by the base 104. For example, wireless interfaces may be used to transmit display data and other information handling system data between the displays and the base 104 while physical interfaces may be used to transmit power between attached displays and the base 104. Alternatively, power may be transmitted between the displays and the base via a wireless inductive interface. An example physical interface for connecting a display to the base 104 is a spring loaded pogo-to-pads interface for contacting contact pads of an attached display. In particular, beryllium copper spring pins may provide sliding contact to gold pads on one or more displays. Leaf springs may be used to apply pressure to the pins. An example wireless interface may be a short-range high-speed radio wireless contact connector or a Bluetooth connection between the base and one or more displays. In an example combination of wireless and physical interfaces, pogo pins and corresponding pads may be used to transmit power between one or more displays and a base while a short-range radio wireless contact connector may be used to transmit data between a base and one or more displays. A single display may connect to both of the interfaces 110A-B or a first display may connect to interface 110A and a second interface may connect to interface 110B. The interfaces 110A-B may be identical to facilitate interchangeable and reversible connection of a display to each interface. For example, each interface may transmit power and data sufficient to support at least one display. Power and data pinouts for physical interfaces may be symmetrical to one or more displays to be connected and attached to the base facing towards or away from a user. Alternatively, a single wireless interface of the base 104 may support connection to multiple displays simultaneously.

Figure 2:
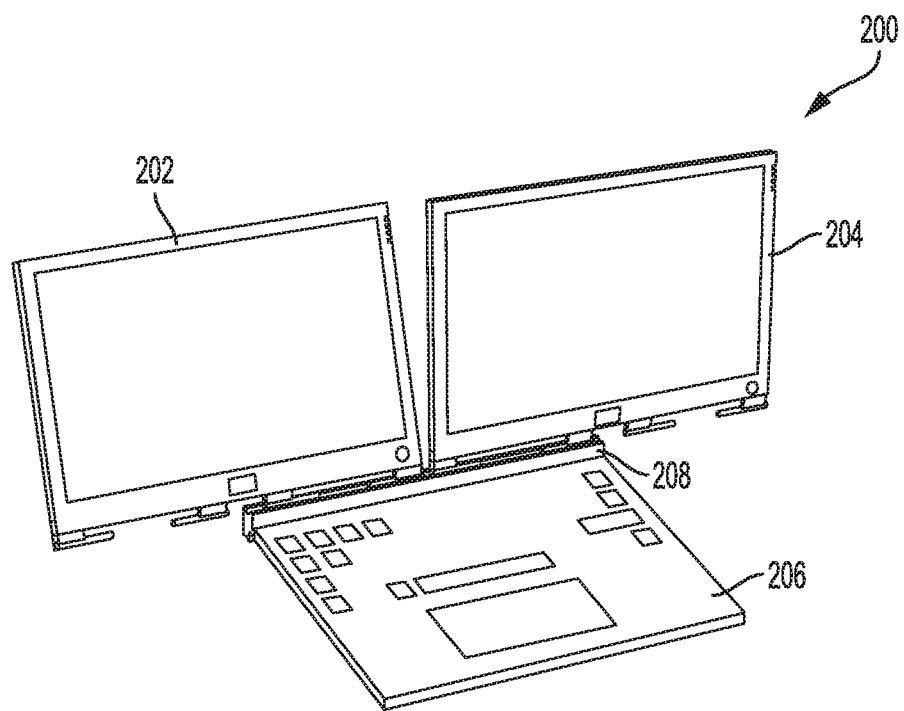
FIG. 2 is an illustration of a portable information handling system in a dual-display extended configuration according to some embodiments of the disclosure.

Multiple displays may be attached to and supported by a base simultaneously. FIG. 2 is an illustration of a dual-display extended display configuration of a portable information handling system 200. A first detachable display 202 and a second detachable display 204 may be simultaneously attached to and supported by a base 206 via component 208 for attaching the displays to the base 206 such as a channel for magnetically attaching the base 206 to one or more bars of a first display 202 and a second display 204. For example, the first display 202 may be attached to and supported by the base 206 along approximately a first half of a length of the base 206 and the second display 204 may be attached to and supported by the base 206 along approximately a second half of the length of the base 206. The first display 202 may connect to a first interface of the base 206 and the second display 204 may connect to a second interface of the base 206. The first display 202 may display different information, such as additional application windows, from the second display 204.

Figure 3A:
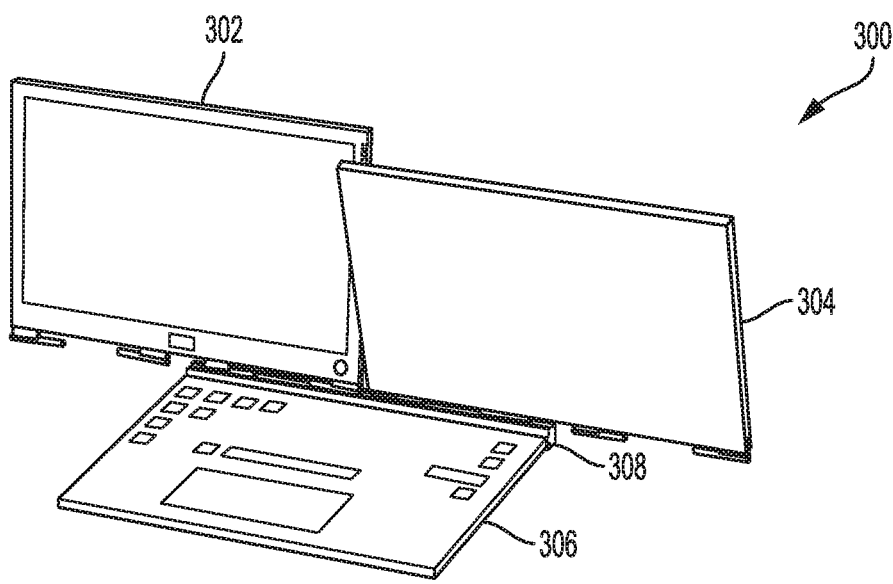
FIG. 3A is an illustration of a first perspective of a portable information handling system in a dual-display presentation configuration according to some embodiments of the disclosure.
Figure 3B:
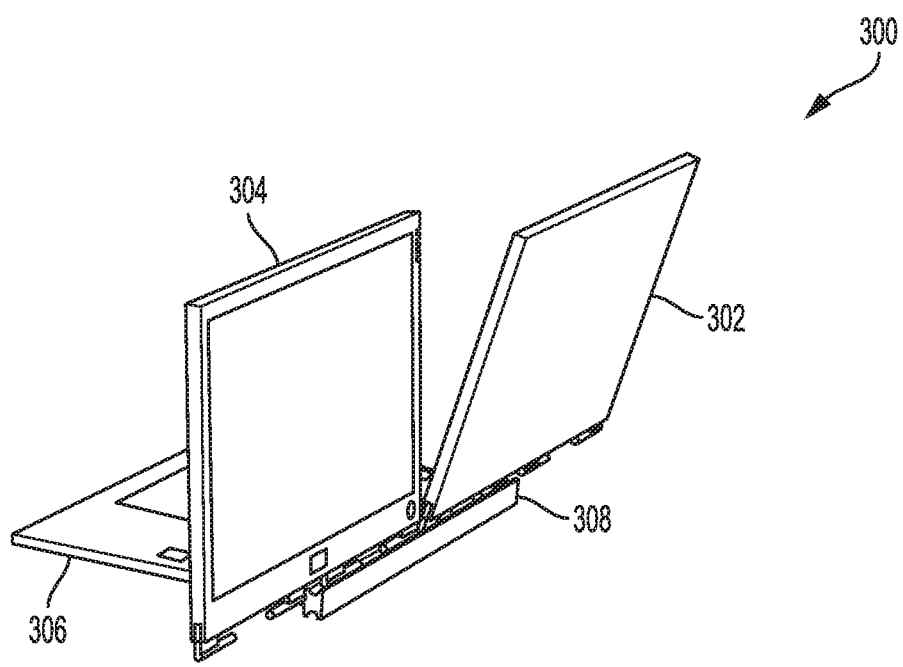
FIG. 3B is an illustration of a second perspective of a portable information handling system in a dual-display presentation configuration according to some embodiments of the disclosure.

Users may also want to display content on their portable information handling system to an audience. In such situations, the portable information handling system 300 may operate in a dual-display presentation configuration, as illustrated in FIGS. 3A-3B. A user of a portable information handling system in a dual-display extended configuration may transition the system to the dual-display presentation configuration by detaching a display, reversing it to face away from the user, and reattaching the display to the base. A first display 302 may be attached to a base 306 facing forwards towards a front of the base while a second display 304 may be attached to the base 306 facing out from a back of the base. Thus, the first display 302 and the second display 304 may be attached to and supported by the base 306 facing in opposite directions. The first and second displays 304, 306 may be attached to and supported by the base 306 by a component 308 for attaching the displays 304, 306 to the base 304, such as a channel and bars magnetically attracted to each other, or other attachment means. When in the dual-display presentation configuration, identical content may be displayed on the first display 302 and the second display 304. Alternatively, user content, such as presentation notes, may be displayed on the first display 302, while presentation content, such as slides of a presentation, may be displayed on the second display 304. Thus, a user may view the first display 302 and control the portable information handling system 300 while presenting content to an audience on the second display 304.

Figure 4A:
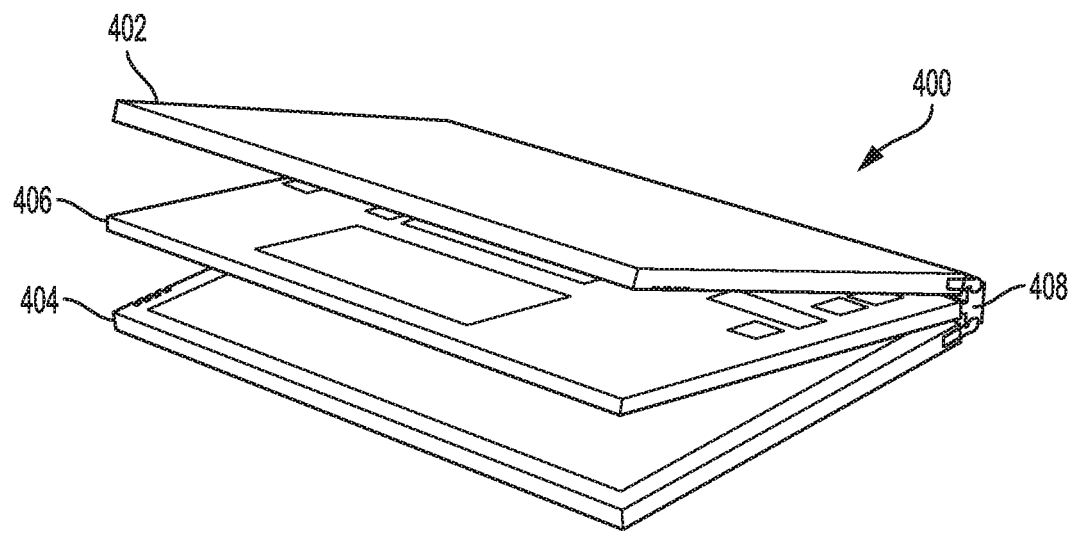
FIG. 4A is an illustration of a portable information handling system with two displays in a partially closed configuration according to some embodiments of the disclosure.
Figure 4B:
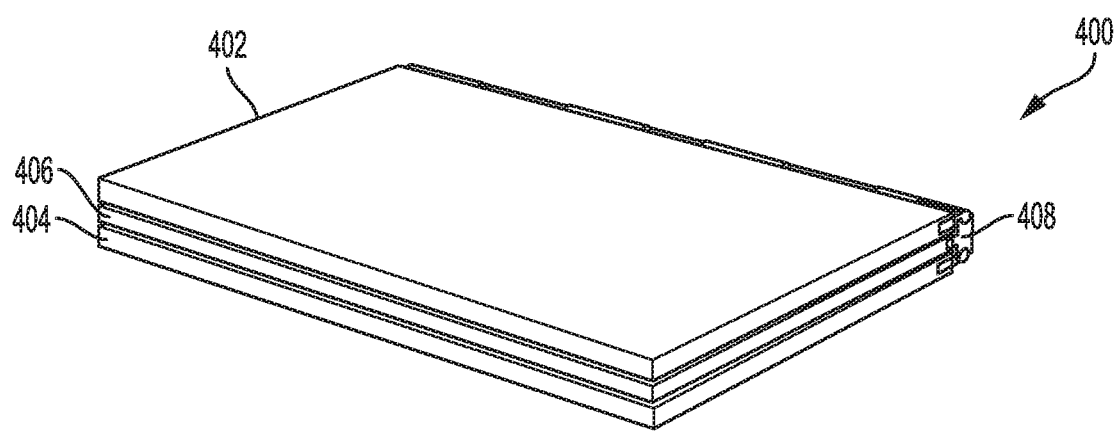
FIG. 4B is an illustration of a portable information handling system with two displays in a closed configuration according to some embodiments of the disclosure.

When a user is transporting a portable information handling system, it may be desirable for the portable information handling system to be stored in a closed configuration, to reduce the amount of space taken up by the portable information handling system and the likelihood of damage to components of the information handling system. A portable information handling system in a partially closed configuration is illustrated in FIG. 4A. To place the portable information handling system 400 in the closed configuration, a first display 402 may be attached to an upper portion of a component 408 for attaching one or more displays to a base 406 while a second display 404 may be attached to a lower portion of a component 408 for attaching one or more displays to the base 406. For example, the component 408 for attaching one or more displays may include a first channel facing up and a second channel facing down, or other means for attaching multiple displays to the base. The channels may be sized to attach to one or more bars of the first display 402 and the second display 404. After the displays are attached, the second display 404 may be adjusted until it closes against the base 406. When the information handling system is in a single display configuration, the second display 404 may be stored closed against an underside of the base 406. The first display 402 may be adjusted until it closes against the base 406. When both displays 402, 404 have been adjusted to close against the base 406, the device may be in a closed configuration, as illustrated in FIG. 4B. Alternatively, the second display 404 may be removed entirely, when unneeded, to reduce the weight of the portable information handling system 400.

Figure 5:
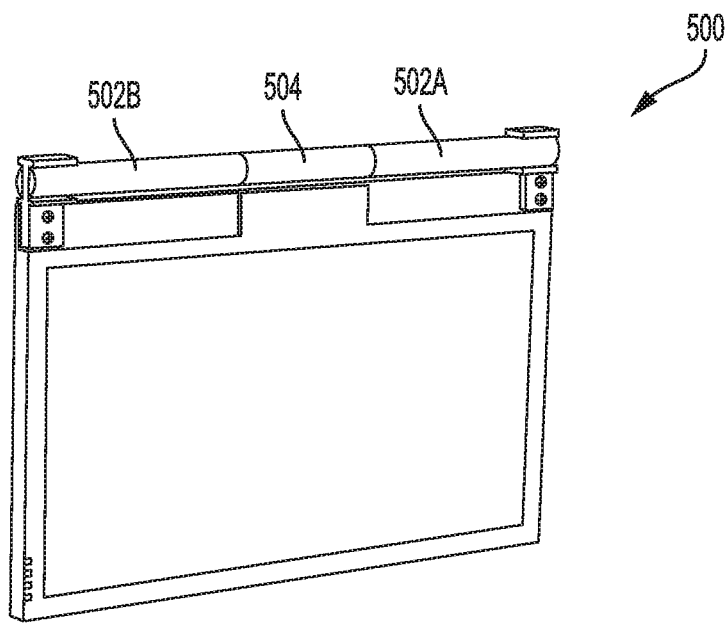
FIG. 5 is an illustration of a detachable display of a portable information handling system in a hanging configuration according to some embodiments of the disclosure.

Other configurations for attachment of a display to a base are possible using other components. A display 500 having first and second magnetic bars 502A-B may operate in a hanging configuration, as illustrated in FIG. 5. A display 500 having a single magnetic bar or four magnetic bars, as illustrated in FIG. 1B, along a length of the display 500 may also operate in a hanging configuration. The display 500 may include a touch screen, a battery, and other internal information handling system components enabling the display 500 to perform some functions when not attached to and supported by a base. Thus, a user may detach the display 500 from the base, and hang the display from a metallic surface, such as a locker, a refrigerator, or other metallic surface.

Figure 6:
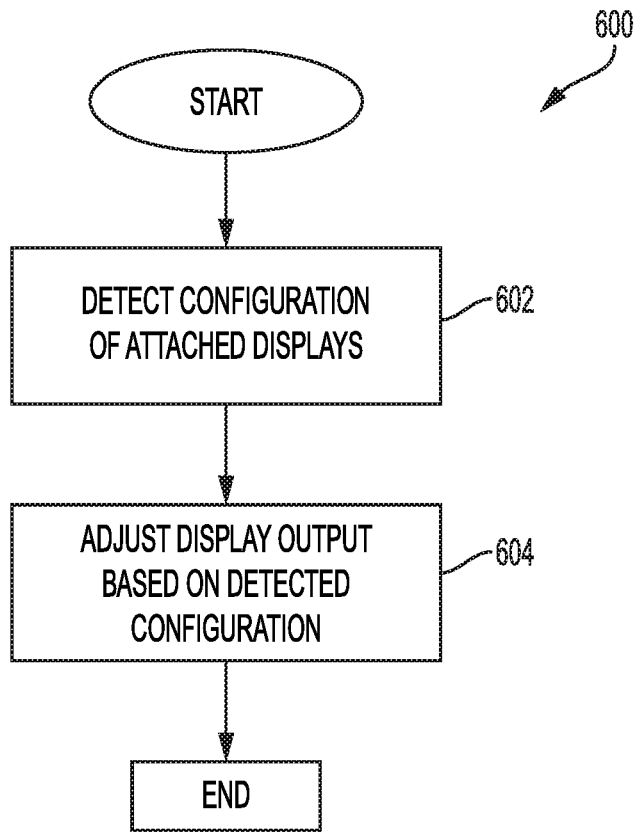
FIG. 6 is an example method for detecting a configuration of multiple displays attached to and supported by an information handling system and adjusting display output based on the configuration according to some embodiments of the disclosure.

A controller of a portable information handling system may detect a configuration of displays attached to and supported by a base, for transmission of appropriate display data to each of the attached displays. An example method 600 for detecting a configuration of displays attached to and supported by the base is illustrated in FIG. 6. The method may begin with detecting a configuration of displays attached to and supported by a base at step 602. Such a configuration may be detected via a connection between interfaces of one or more displays and interfaces of a base. For example, if a base has two interfaces, the controller may detect a display identifier at each interface. If the display identifiers are identical, the base may be attached to a single display. If the display identifiers are different, the base may be attached to two different displays. Furthermore, each display may comprise left and right interfaces for connecting to the base, and may assign a unique identifier to each interface. If a left display interface and a right display interface of two different displays are detected by the controller, then the displays may be attached in a dual-display extended configuration. If two right display interfaces or two left display interfaces are connected to the interfaces of the base, then the displays may be attached in a dual-display presentation configuration. If a left display interface is detected by a right interface of a base and a right display interface, of the same display, is detected by a left interface of the base, then the display may be attached to the base in a viewing or tablet configuration. The controller may then adjust, at step 604, display output of the portable information handling system based on the detected configuration. For example, if a single display configuration is detected, the controller may adjust display output to fit a single display. If a dual-display extended configuration is detected, the controller may adjust display output to display different content on the first and second displays, side by side. If a dual-display presentation configuration is detected, the controller may adjust display output to display identical content on the first display and the second display, or user content on the first display and presentation content on the second display.

Figure 7:
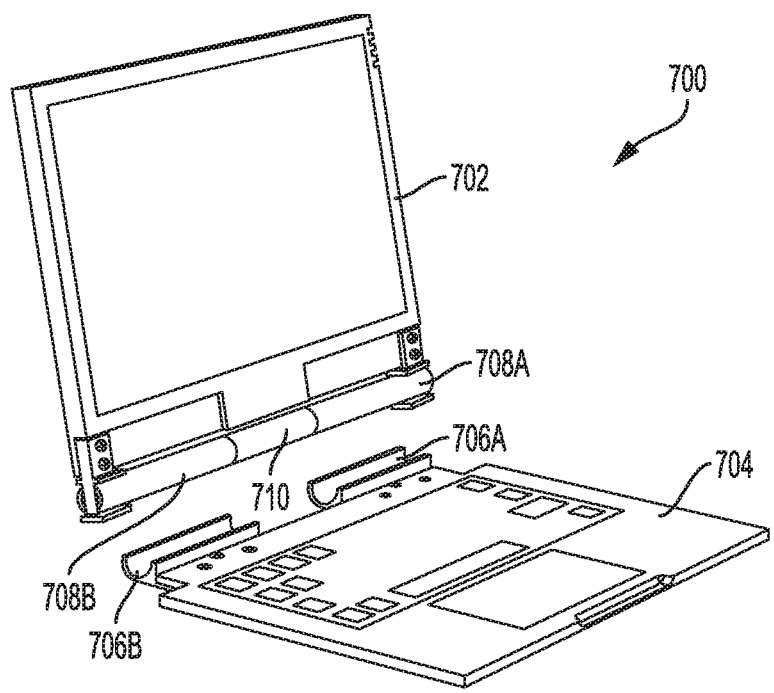
FIG. 7 is an illustration of a portable information handling system with a detachable display including a magnetic hinge for attaching a display to a base according to some embodiments of the disclosure.

A display of a portable information handling system may attach to a base by means of two magnetic bars and two metallic channels. For example, a portable information handling system 700 may include a detachable display 702 attached to a base 704 by means of a first magnetic bar 708A and a second magnetic bar 708B of the display 702 and a first metallic channel 706A and a second metallic channel 706B of the base 704, as illustrated in FIG. 7. Alternatively, the channels may be magnetic and the bars may be metallic. A non-magnetic bar 710 may attach the first bar 708A to the second bar 708B and may house indicator light emitting diodes, antennas, or other system components. Alternatively, a single bar and/or a single channel may span a length of the display 702 and a length of the base 704. The first bar 708A and the second bar 708B may comprise a nonferrous material surrounding an internal bar magnet or multiple internal bar magnets, or the bars 708A-B may comprise rod magnets. Internal bar magnets of the first and second bars 708A-B may be positioned to maximize the angular range where magnetic force is aligned to the first and second metal channels 706A-B. When the display 702 is attached to and supported by the base 704, the first bar 708A and the second bar 708B may rest in and be magnetically attached to the first channel 706A and the second channel 706B.

Figure 8:
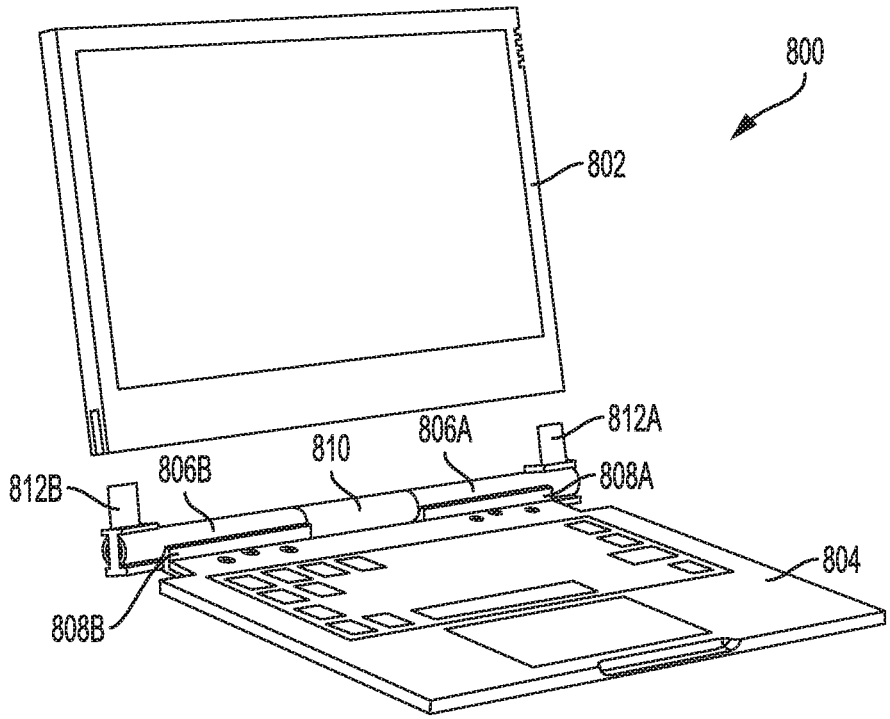
FIG. 8 is an illustration of a portable information handling system with a detachable display including a blade hinge for attaching a display to a base according to some embodiments of the disclosure.

One example of a component for attaching one or more displays, such as display 802, to a base 804 of a portable information handling system 800, is a blade hinge as illustrated in FIG. 8. The base 804 may include a first magnetic channel 808A, a second magnetic channel 808B, a first magnetic bar 806A and a second magnetic bar 806B. The first magnetic bar 806A and the second magnetic bar 806B may rest in the first and second channels 808A-B and may be attached to each other via a non-magnetic bar 810. A first blade 812A may be attached to an end of the first magnetic bar 806A and a second blade 812B may be attached to an end of the second magnetic bar 806B. The bars 806A-B and blades 812A-B may be rotatable within the first and second channels 808A-B. The display 802 may have openings to attach to the first and second blades 812A-B. For example, the first and second blades 812A-B may fit inside and may attach magnetically to the display 802 via two openings. When the base 804 is attached to multiple displays, the first blade 812A may fit inside an opening of a first display and the second blade 812B may fit inside an opening of a second display.

Figure 9A:
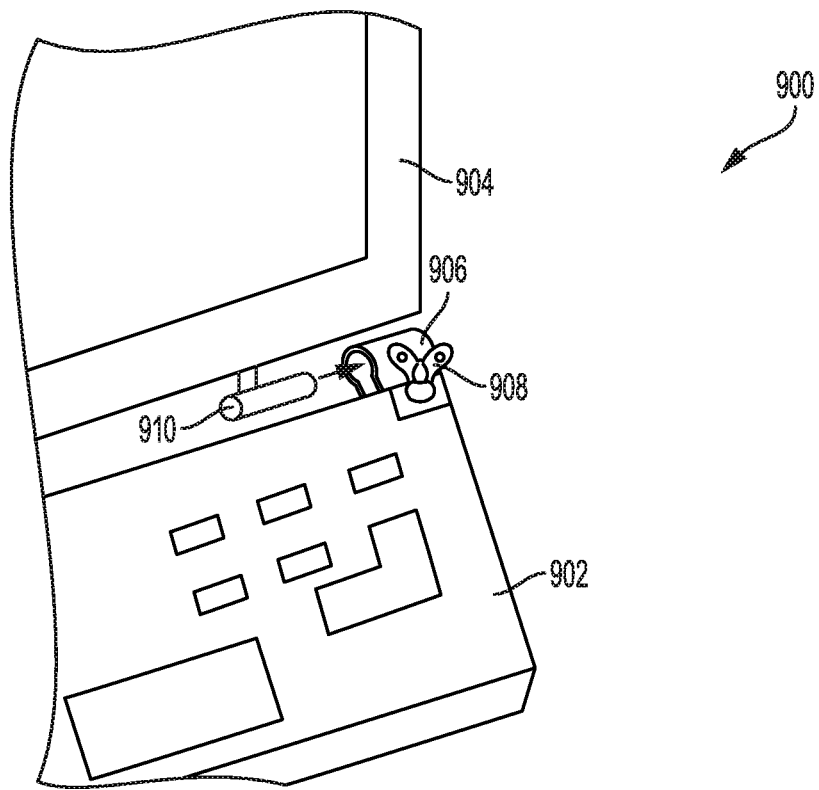
FIG. 9A is an illustration of a portable information handling system including an adjustable clamp for attaching a display to a base according to some embodiments of the disclosure.
Figure 9B:
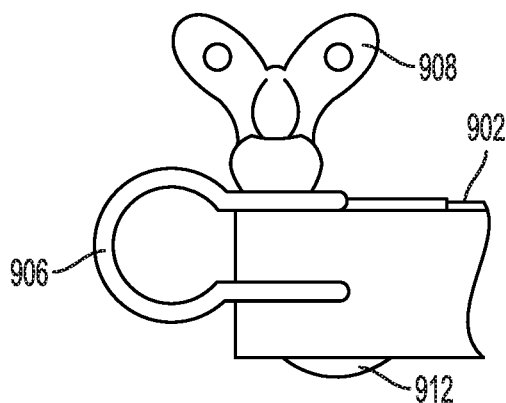
FIG. 9B is an illustration of an adjustable clamp for use in attaching a display of a portable information handling system to a base of a portable information handling system according to some embodiments of the disclosure.

Another example of a component for attaching one or more displays, such as display 904, of a portable information handling system 900 to a base 902 is illustrated in FIG. 9A. A display 904 may include one or more bars, such as bar 910, for attaching the display 904 to the base 902. The base may include a clamp 906 and a wingnut 908, or other tightening mechanism such as an eccentric cam, for tightening the clamp 906. When a bar of the display, such as bar 910, is inserted into the clamp 906, the wingnut 908 may be turned to tighten the clamp 906 around the bar 910 to attach the base 902 to the display 904. Wingnut 908 may be positioned outside of a display profile of the display 904 or may fold flat so as to avoid blocking a view of a user. The bar 910 may be magnetic and clamp 906 may be metallic to facilitate a more secure attachment. A corresponding bar and clamp may be located on an opposite side of the display 904 and the base 902 so that, in a single display configuration, the base 902 may be attached to the display 904 on both sides. In a dual display configuration, each display may attach to the base by a single bar and clamp. Alternatively, a half-channel journal bearing may be located on the opposite side. FIG. 9B is an illustration of a clamp 906 for attaching a base 902 of a portable information handling system to a display. The clamp may be tightened by turning wingnut 908. A rubber foot 912 may be attached to a bottom of the base 902 to prevent the base 902 from scratching a surface upon which it rests.

Figure 10:
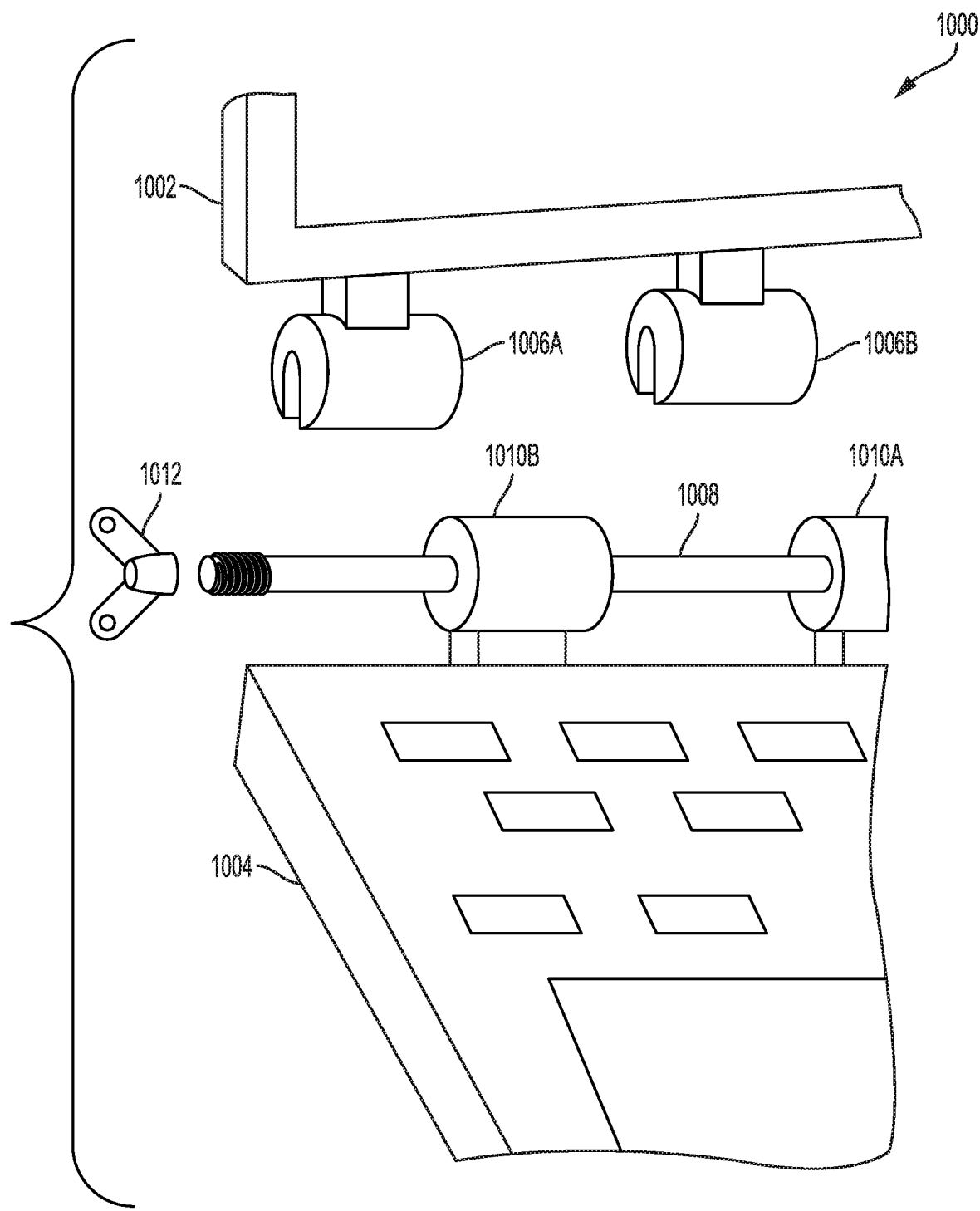
FIG. 10 is an illustration of a friction plate hinge for attaching a display of a portable information handling system to a base of a portable information handling system according to some embodiments of the disclosure.

Another example of a component for attaching one or more displays, such as display 1002, to a base 1004 of a portable information handling system 1000 is a friction plate hinge, as illustrated in FIG. 10. A display 1002 may have a first clutch 1006A and a second clutch 1006B. An axle 1008 may be attached to the base 1004 by a first friction surface/plate 1010A and a second friction surface/plate 1010B. The display 1002 may be attached to the base 1004 by sliding the first and second clutches 1006A-B over the axle 1008 and applying tension to the axle 1008 by tightening a wingnut 1012 at an end of the axle. Alternatively, an eccentric cam or other tightening mechanism may be used in place of the wingnut 1012. Corresponding first and second clutches and first and second friction surfaces/plates may be present at the opposite end of the base 1004 and display 1002. A single wingnut 1012 may be used to tighten the axle 1008 and secure multiple displays to the base 1004.

Figure 11:
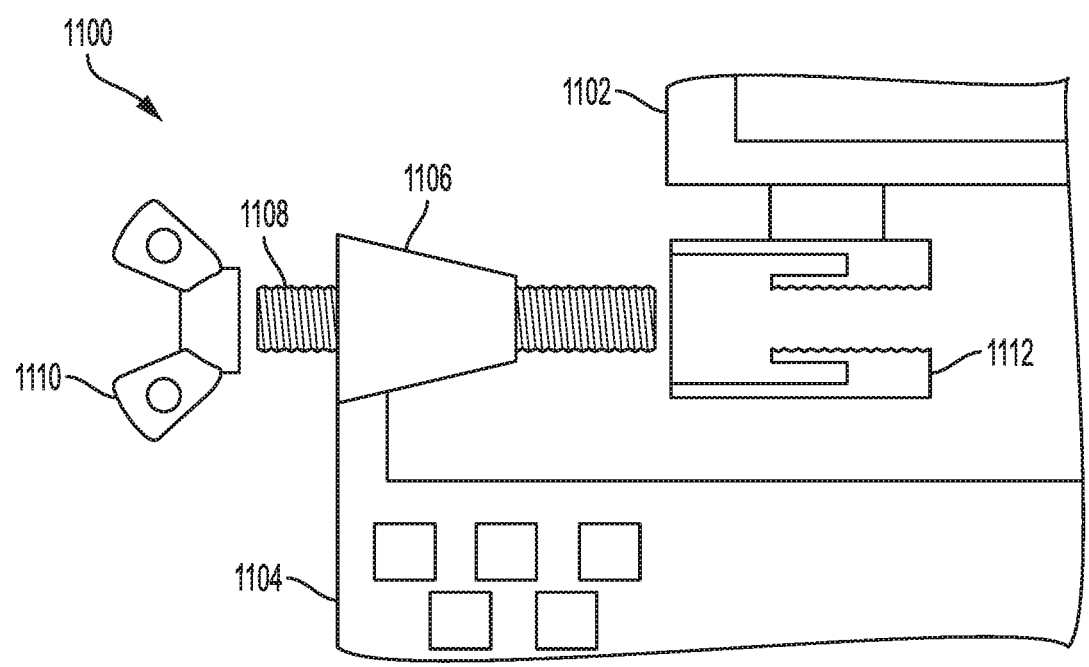
FIG. 11 is an illustration of a wedge friction hinge for attaching a display of a portable information handling system to a base of a portable information handling system according to some embodiments of the disclosure.

Another example component for attaching one or more displays, such as display 1102, to a base 1104 of a portable information handling system 1100 is a wedge friction hinge, as illustrated in FIG. 11. A display 1102 may have a cylinder 1112 for attaching to a screw 1108 and enclosing a cone 1106 of the base 1104. The base 1104 may have a cone 1106 encircling a screw 1108 for attaching the base 1104 to one or more displays. When the display 1102 is lowered and the cylinder 1112 is placed over the cone 1106, a wingnut 1110 at an end of the screw may be tightened to secure the base 1104 to the display 1102. Alternatively, an eccentric cam may be used in place of the wingnut 1110. A similar cylinder may be present on the opposite side of the display 1102, and a similar cone, screw, and wingnut may be present on an opposite side of the base. Alternatively, a cone screw and wingnut may be attached to the opposite side of the display 1102, while a cylinder may be attached to the opposite side of the base 1104. The opposite side of the display 1102 may include an alternative attachment mechanism such as a magnetic bar while the opposite side of the base 1104 may include an alternative attachment mechanism such as a metallic channel.

The schematic flow chart diagram of FIG. 5 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An information handling system comprising:
a first display comprising a first bar attached to a first edge of the first display;
a second display comprising a second bar attached to a first edge of the second display; and
a base comprising an integrated channel surrounding greater than 180 degrees around a hollow cylindrical portion with an opening at an end of the integrated channel configured to receive the first bar of the first display and the second bar of the second display,
wherein the integrated channel is configured to magnetically attach to the first bar of the first display and the second bar of the second display and to support the first and second displays simultaneously,
wherein the base further comprises first and second interfaces for connecting the base to the first and second displays,
wherein at least one of a second edge of the first display and a second edge of the second display extends beyond a first edge of the base when the first display and the second display are attached to and physically supported by the base, and
wherein a first angle of the first display with respect to the base is separably adjustable from a second angle of the second display with respect to the base.

2. The system of claim 1, wherein the first and second interfaces are wireless interfaces.

3. The system of claim 1, wherein each of the first and second interfaces comprises symmetric power and data pins for connecting to the first and second displays when facing toward a front of the base or toward a back of the base.

4. The system of claim 1, wherein each of the first and the second displays comprises first and second interfaces for connecting the first display and the second display to the base.

5. The system of claim 1, wherein the integrated channel is an upward-facing integrated channel.

6. The system of claim 5, wherein the base further comprises an integrated downward-facing channel, and wherein the integrated downward-facing channel is configured to attach to either the first display or the second display to store the first display or the second display below the base.

7. The system of claim 1, wherein the first and second bars are cylindrical bars, and wherein the integrated channel is configured to encompass greater than 180 degrees of a circumference of the first and second bars when the first and second bars are magnetically attached to the integrated channel.

8. An information handling system comprising:
a first detachable display;
a second detachable display; and
a base comprising a means for attaching to, and physically supporting, the first detachable display and the second detachable display simultaneously, the means for attaching surrounding greater than 180 degrees around a hollow cylindrical portion with an opening at an end of the means for attaching configured to receive a first bar of the first display and a second bar of the second display, wherein the base further comprises first and second interfaces for connecting the base to the first and second displays, wherein at least one of a first edge of the first display and a first edge of the second display extends beyond a first edge of the base when the first display and the second display are attached to and physically supported by the base, and wherein a first angle of the first display with respect to the base is separably adjustable from a second angle of the second display with respect to the base.

9. The information handling system of claim 8, wherein the means for attaching is configured to attach to and support the first detachable display in a single-display configuration.

10. The information handling system of claim 9, wherein the means for attaching is configured to store the second detachable display when configured in the single-display configuration.

11. The information handling system of claim 8, wherein the means for attaching is configured to attach to and support the first detachable display and the second detachable display simultaneously in a dual-display configuration.

12. The information handling system of claim 11, wherein the means for attaching is configured to attach to and support the first detachable display and the second detachable display with the first detachable display and the second detachable display facing in the same direction in the dual-display configuration.

13. The information handling system of claim 11, wherein the means for attaching of the base is configured to attach to and support the first detachable display and the second detachable display with the first detachable display and the second detachable display facing in opposite directions in the dual-display configuration.

14. The information handling system of claim 8, wherein the means for attaching is a magnetic attachment means and wherein the base is configured to attach to and support the first detachable display and the second detachable display magnetically.

15. The information handling system of claim 8, wherein the first and second interfaces are wireless interfaces.

16. The information handling system of claim 8, wherein the base is configured to store both the first detachable display and the second detachable display in a closed configuration.

17. An information handling system, comprising:
a base comprising an integrated keyboard and a means for attaching to, and physically supporting, a plurality of displays; and
a controller,
wherein the controller is configured to perform steps comprising:
detecting a configuration of a plurality of displays attached to and physically supported by the base; and
adjusting a display output of the information handling system to the plurality of displays based on the detected configuration,
wherein detecting the configuration of the plurality of displays comprises detecting whether a first display of the plurality of displays is facing in a same direction as or a different direction from a second display of the plurality of displays, and
wherein adjusting the display output of the information handling system to the plurality of displays based on the detected configuration comprises adjusting the display output of the information handling system to the plurality of displays based on the detection of whether the first display of the plurality of displays is facing in a same direction as or a different direction from a second display of the plurality of displays.

18. The information handling system of claim 17, wherein detecting whether a first display of the plurality of displays is facing in a same direction as or a different direction from a second display of the plurality of displays comprises detecting that the first display and the second display are facing in opposite directions, and, wherein the step of adjusting comprises adjusting the display output to display the same content on the first display and the second display based on the detection that the first display and the second display are facing in opposite directions.

* * * * *